United States Patent [19]

Meinert et al.

[11] Patent Number: 4,859,635
[45] Date of Patent: Aug. 22, 1989

[54] OPTICAL FLUOROPHOSPHATE GLASS HAVING ANOMALOUS POSITIVE PARTIAL DISPERSION AND PROCESS FOR ITS PRODUCTION

[75] Inventors: Norbert Meinert; Werner Huber, both of Solms-Albshausen; Rainer Dreuth, Wetzlar-Niedergirmes; Henning Franek, Braunfels-Tiefenbach, all of Fed. Rep. of Germany

[73] Assignee: Ernst Leitz Wetzlar GmbH, Wetzlar, Fed. Rep. of Germany

[21] Appl. No.: 268,635

[22] Filed: Nov. 8, 1988

Related U.S. Application Data

[63] Continuation of Ser. No. 59,925, Jun. 9, 1987, abandoned.

[30] Foreign Application Priority Data

Oct. 26, 1985 [DE] Fed. Rep. of Germany ....... 3538491
Oct. 18, 1986 [DE] Fed. Rep. of Germany ....... 3635445

[51] Int. Cl.$^4$ ..................... C03C 3/247; C03C 4/00
[52] U.S. Cl. ........................ 501/44; 501/902
[58] Field of Search ...................... 501/44, 902

[56] References Cited

U.S. PATENT DOCUMENTS

| | | | |
|---|---|---|---|
| 3,492,136 | 1/1970 | Brömer et al. | 501/44 |
| 3,508,937 | 4/1970 | Brömer et al. | 501/44 |
| 3,671,276 | 6/1972 | Brömer et al. | 501/44 |
| 3,847,624 | 11/1974 | Brömer et al. | 501/44 |
| 4,040,846 | 8/1977 | Broemer et al. | 501/44 |
| 4,213,788 | 7/1980 | Kamiyama | 501/44 |
| 4,225,459 | 9/1980 | Faulstich et al. | 501/44 |
| 4,386,163 | 5/1983 | Kodama | 501/44 |

FOREIGN PATENT DOCUMENTS 2306174 10/1976 France ................. 501/46

OTHER PUBLICATIONS

Chemical Abstracts, vol. 103, No. 10, Abstract No. 75254q.

*Primary Examiner*—Mark L. Bell
*Attorney, Agent, or Firm*—Foley & Lardner, Schwartz, Jeffery, Schwaab, Mack, Blumenthal & Evans

[57] ABSTRACT

Optical fluorophosphate glass which is based on $Mg(PO_3)_2$, $Ca(PO_3)_2$, $Ba(PO_3)_2$, $Al(PO_3)_3$, $MgF_2$, $CaF_2$, $SrF_2$, $AlF_3$, BaO and SrO and has a refractive index $n_e$ between 1.515 and 1.546, an Abbe value $\nu_e$ between 75.8 and 77.4 and a positive anomalous partial dispersion value $\Delta\nu_e$ between 14.85 and 15.15.

The glass comprises (in weight-%) 2.4–2.7 Mg; 4.5–4.9 Ca; 15.9–17.6 Sr; 20.2–22.3 Ba; 5.6–6.2 Al; 8.8–9.7 P; 22.0–24.3 F and 15.7–17.4 O. The improved physico-chemical parameters, such as linear expansion coefficient, glass transition temperature $T_g$, density $\zeta$, Knoop-hardness HK, etc., are stated. Finally, a production process for this optical glass is described.

5 Claims, No Drawings

OPTICAL FLUOROPHOSPHATE GLASS HAVING ANOMALOUS POSITIVE PARTIAL DISPERSION AND PROCESS FOR ITS PRODUCTION

This application is a continuation of application Ser. No. 059,925, filed June 9, 1987 now abandoned.

The application relates to an optical fluorophosphate glass which exhibits anomalous positive partial dispersion and is based on alkaline earth metal metaphosphates, aluminum metaphosphate, alkaline earth metal fluorides, aluminum fluoride and alkaline earth metal oxides, and a process for its production.

For many purposes, the glasses used in the construction of precision optical instruments possess, in addition to well-tried combinations of optical parameters ($n_e/\nu_e$ parameter pairs) and anomalous partial dispersion values, extreme values in their other physico-chemical properties too. It is the task of the glass chemist to develop optical glasses in which as large a number as possible of all other physical properties are optimized in predetermined manner, without adversely influencing or altering the already well-tried optical parameters. Since a modern formulation for optical glass is a multi-component system, any detectable, i.e. measurable, improvement in individual parameters represents a further step in optimization of the specific material.

It is therefore the object of the present invention to provide an optical glass of this type in which, while retaining its extreme optical data (refractive index, Abbe value, anomalous partial dispersion), the physico-chemical properties of this glass and its technological conditions of production are so improved that reproducible large scale production can be carried out without difficulty, and the resulting glass can, in particular, be produced in large stria-free and bubble-free units.

This object is achieved, according to the invention, by optical fluorophosphate glass based on metaphosphates and fluorides of alkaline earth metals and of aluminum and on alkaline earth metal oxides having refractive indices $n_e$ between 1.515 and 1.546, Abbe values $\nu_e$ between 75.8 and 77.4 and positive anomalous partial dispersion values $+\Delta\nu_e$ between 14.85 and 15.15, characterized in that it has the following atomic composition in weight-%:

|    |           |
|----|-----------|
| Mg | 2.4–2.7   |
| Ca | 4.5–4.9   |
| Sr | 15.9–17.6 |
| Ba | 20.2–22.3 |
| Al | 5.6–6.2   |
| P  | 8.8–9.7   |
| F  | 22.0–24.3 |
| O  | 15.7–17.4.|

In a preferred embodiment, the glass of the invention is characterized in that it has a refractive index $n_e=1.530$, an Abbe value $\nu_e=76.6$, a positive anomalous partial dispersion value $\Delta\nu_e=+15$ and the following atomic composition in weight-%:

|    |      |
|----|------|
| Mg | 2.6  |
| Ca | 4.7  |
| Sr | 16.8 |
| Ba | 21.2 |
| Al | 5.9  |
| P  | 9.2  |
| F  | 23.1 |
| O  | 16.5.|

Glass according to the invention preferably has the following physico-chemical parameters:
linear thermal expansion coefficient $\alpha_{20/300°C.}=14.0–14.3\ [10^{-6}\cdot1/°C.]$
glass transition temperature $=495°–510\ [°C.]$
specific weight $\zeta=3.7–3.9\ [g/cm^3]$
Knoop-hardness HK $=380–390$.

In the following table, the optical and physicochemical properties of a known glass are compared with the same properties of the glass according to the invention.

| Known Glass | Parameter | Glass According to the Invention |
|---|---|---|
| 1.5302 | $n_e$ | 1.5302 |
| 76.6 | $\nu_e$ | 76.6 |
| 0.4795 | $\nu'_g$ | 0.4795 |
| +15 | $\Delta\nu_e$ | +15 |
| 14.80 | $\alpha_{20/300°C.}$ $[10^{-6}\cdot1/°C.]$ | 14.18 |
| 488 | $T_g\ [°C.]$ | 501 |
| 3.97 | $\zeta\ [g/cm^3]$ | 3.78 |
| 340 | HK | 385 |
| 1 | FR | 1–2 |
| 51 | SR | 51 |

The first four stated parameters designate optical properties and have the following meanings:
$n_e$ = refractive index
$\nu_e$ = Abbe number (reciprocal of the dispersion)
$\theta_g'$ = (actual) anomalous partial dispersion, whereby $$\theta_g' = \frac{n_g - n_F}{n_F - n_{C'}},$$

in which the subscript indices have the following meanings:
g = blue mercury line (435.84 nm)
F' = blue cadmium line (479.99 nm)
C' = red cadmium line (643.85 nm)
$+\Delta\nu_e$ = positive deviation from the "normal line", as illustrated graphically in, for example, the drawing of German Pat. No. 1,496,563 or the corresponding U.S. Pat. No. 3,451,829 and explained in the associated text. This difference is designated as the "positive" anomalous partial dispersion value.

The lower six parameters designate physicochemical properties, i.e.:
$\alpha_{20/300°C.}$ = linear thermal expansion coefficient $[10^{-6}\cdot1/°C.]$
$T_g$ = glass transition temperature [°C.]
$\zeta$ = density [g/cm$^3$]
HK = Knoop-hardness
FR = stain resistance
SR = acid resistance.

The summary clearly shows the improved properties while the optical positional parameters remain constant. The glass according to the invention listed in the table consists of (in weight-%) 2.57Mg, 4.69Ca, 16.75Sr, 21.22Ba, 5.90Al, 9.22P, 23.23F and 16.52O. It can be utilized in modern telephoto lenses and for fast (intense light) wide-angle lenses.

Glass according to the invention is produced by a process in which the glass is molten from a mixture which has the following composition (in weight-%):

|  |  |
|---|---|
| Mg(PO$_3$)$_2$ | 0.5–1 |
| Ca(PO$_3$)$_2$ | 1–2 |
| Ba(PO$_3$)$_2$ | 21–24 |
| Al(PO$_3$)$_3$ | 10–12, | wherein the total content of all metaphosphates is between 33 and 38 weight-%;

|  |  |
|---|---|
| MgF$_2$ | 6–7 |
| CaF$_2$ | 8–10 |
| SrF$_2$ | 15–18 |
| AlF$_3$ | 14–16 | wherein the total content of all fluorides is between 45 and 48 weight-%;

|  |  |
|---|---|
| BaO | 11–13 |
| SrO | 5–7 | wherein the total content of all oxides is between 16 and 20 weight-%.

In a preferred glass producing process, the mixture has the following composition (in weight-%):

|  |  |
|---|---|
| Mg(PO$_3$)$_2$ | 0.8–0.9 |
| Ca(PO$_3$)$_2$ | 1.2–1.4 |
| Ba(PO$_3$)$_2$ | 21.2–23.4 |
| Al(PO$_3$)$_3$ | 10.5–11.6 |
| MgF$_2$ | 6.0–6.6 |
| CaF$_2$ | 8.2–9.1 |
| SrF$_2$ | 15.6–17.3 |
| AlF$_3$ | 14.1–15.6 |
| BaO | 11.5–12.7 |
| SrO | 5.9–6.6. |

In a particularly preferred glass producing process, the mixture has the following composition (in weight-%):

|  |  |
|---|---|
| Mg(PO$_3$)$_2$ | 0.80 |
| Ca(PO$_3$)$_2$ | 1.27 |
| Ba(PO$_3$)$_2$ | 22.31 |
| Al(PO$_3$)$_3$ | 11.00 |
| MgF$_2$ | 6.32 |
| CaF$_2$ | 8.64 |
| SrF$_2$ | 16.44 |
| AlF$_3$ | 14.88 |
| BaO | 12.10 |
| SrO | 6.24. |

The process for producing glass according to the invention is characterized in that it is carried out according to the following steps:

(a) heating the starting mixture at 860°–900° C. within a period of 100–130 minutes, (b) increasing the temperature within 5 minutes to 1150°–1170° C., (c) subsequently stirring within a period of from 60 to 90 minutes, (d) reducing the melt temperature to 930°–970° C. at a reduced stirring speed, and (e) casting at a temperature of from 750° to 760° C. in molds preheated to about 510° C.

In a particularly preferred embodiment, the process for producing glass according to the invention is carried out according to the following steps:

(a) heating the starting mixture in a platinum crucible at 880° C. within a period of 120 minutes, (b) increasing the temperature within 5 minutes to 1160° C., (c) subsequently stirring at a stirrer speed of 180 revolutions per minute within a period of 90 minutes, (d) reducing the melt temperature to 950° C. and decreasing the stirring speed to 80 revolutions per minute, and (e) casting at a temperature of from 750° to 760° C. in aluminum molds preheated to 510° C.

The performance of a 10 kg melt is described below. A weighed mixture of:

|  |  |
|---|---|
| Mg(H$_2$PO$_4$)$_2$.5H$_2$O | 135.3 g |
| Ca(H$_2$PO$_4$)$_2$.2H$_2$O | 172.7 g |
| Ba(H$_2$PO$_4$)$_2$ | 2,498.7 g |
| Al(PO$_3$)$_3$ | 1,100.0 g |
| MgF$_2$ | 632.0 g |
| CaF$_2$ | 864.0 g |
| SrF$_2$ | 1,644.0 g |
| AlF$_3$.3H$_2$O | 2,455.2 g |
| BaCO$_3$ | 1,557.3 g |
| SrCO$_3$ | 886.1 g |
| KHF$_2$ | 30.0 g | is thoroughly mixed and then introduced in small portions into a platinum crucible whose temperature is kept constant at approximately 880° C. until the entire batch melted. Charging takes about 120 minutes. Thereafter, the temperature is increased continuously to approximately 1,160° C. over the course of 5 minutes. Once this temperature has been reached, the stirrer is employed and stirring is carried out at a speed of about 180 revolutions per minute. After a stirring time of about 90 minutes, the temperature is decreased to about 950° C., and the stirrer speed is reduced to approximately 80 revolutions per minute at this temperature. At 750° to 760° C., the batch is poured into aluminum molds preheated to approximately 510° C.

The resulting optical glasses are stria-free and bubble-free as well as chemically stable and can be pressed to large-diameter lens blanks.

We claim:

1. Optical fluorophosphate glass based on metaphosphates and fluorides of alkaline earth metals and of aluminum and on alkaline earth metal oxides having refractive indices $n_e$ between 1.515 and 1.546, Abbe values $\nu_e$ between 75.8 and 77.4 and positive anomalous partial dispersion values $+\Delta\nu_e$ between 14.85 and 15.15, characterized in that it consists essentially of the following composition (in weight-%):

|  |  |
|---|---|
| Mg | 2.4–2.7 |
| Ca | 4.5–4.9 |
| Sr | 15.9–17.6 |
| Ba | 20.2–22.3 |
| Al | 5.6–6.2 |
| P | 8.8–9.7 |
| F | 22.0–24.3 |
| O | 15.7–17.4. |

2. Glass according to claim 1, characterized in that it has a refractive index $n_e=1.530$, an Abbe value $\nu_e=76.6$, a positive anomalous partial dispersion value $\Delta\nu_e = +15$ and consists essentially of the following composition (in weight-%):

| | |
|---|---|
| Mg | 2.6 |
| Ca | 4.7 |
| Sr | 16.8 |
| Ba | 21.2 |
| Al | 5.9 |
| P | 9.2 |
| F | 23.1 |
| O | 16.5. |

3. Glass according to claim 1, characterized in that it has a refractive index $n_e = 1.5302$, an Abbe value $\nu_e = 76.57$, a positive anomalous partial dispersion value $\Delta\nu_e = +15$ and consists essentially of the following composition (in weight-%):

| | |
|---|---|
| Mg | 2.57 |
| Ca | 4.69 |
| Sr | 16.75 |
| Ba | 21.22 |
| Al | 5.90 |
| P | 9.22 |
| F | 23.13 |
| O | 16.52. |

4. Glass according to claim 1, characterized in that it has the following physicochemical parameters:
linear thermal expansion coefficient $\alpha_{20/300°C.} = 14.0\text{--}14.3 \, [10^{-6} \cdot 1/°C.]$
glass transition temperature $T_g = 495\text{--}510 \, [°C.]$
specific weight $\zeta = 3.7\text{--}3.9 \, [g/cm^3]$
Knoop-hardness $HK = 380\text{--}390$.

5. Glass according to claim 4, characterized by the following parameters:

| | |
|---|---|
| $\alpha_{20/300°C.}$ | = 14.18 |
| $T_g$ | = 501 |
| $\zeta$ | = 3.78 |
| HK | = 385. |

* * * * *